Patented May 6, 1947

2,420,022

UNITED STATES PATENT OFFICE 2,420,022

PRODUCTION OF ANTHRIMIDES

John Marlin Tinker, Wilmington, Del., and Otto Stallmann, Bridgeton, N. J., assignors to E. I. du Pont de Nemours & Company, Wilmington, Del., a corporation of Delaware No Drawing. Application May 9, 1944, Serial No. 534,819

4 Claims. (Cl. 260—367)

This invention relates to an improved method for making anthrimides and related polynuclear imino compounds which are the intermediates for various, commercially important anthraquinone vat dyes. More particularly, the invention relates to a new condensation method which involves the reaction of high-melting amino-anthraquinone compounds with high-melting halogenated anthraquinones, in the presence of acid-binding salts and catalysts but in the absence of solvents or liquid diluents, in a heated vessel while subjecting the solid reaction mass to continuous attrition and mixing by the aid of mechanical grinding.

The anthrimides with which this invention is particularly concerned are manufactured commercially in large quantities since they are the key intermediates for making the fastest known textile dyes which are used for the dyeing of military and civilian textile goods. They are secondary amines obtained by reacting an amino-anthraquinone compound with a halogenated anthraquinone compound under conditions where one of the hydrogen atoms in the primary amino group is eliminated together with the halogen atom, linking the two anthraquinone nuclei together according to the general reaction:

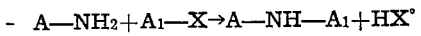

- $A-NH_2 + A_1-X \rightarrow A-NH-A_1 + HX$ wherein A and $A_1$ designate radicals of anthraquinone compounds, while X stands for a halogen atom such as Cl, Br or I. The hydrochloric (or hydrohalic) acid formed in the reaction is neutralized by the addition of acid-binding salts, preferably soda ash, to the original mixture of ingredients which also contains a small amount of copper bronze or copper salts as catalyst.

When a monoamino-anthraquinone compound is condensed with a mono-halogenated anthraquinone, a simple dianthrimide compound is obtained. Anthrimides containing more than two anthraquinone nuclei are formed when more than one mole of a monoamino-anthraquinone is condensed with a poly-halogenated anthraquinone compound, or when a polyamino-anthraquinone compound is reacted with several moles of a monohalogenated anthraquinone or with an anthraquinone compound containing more than one halogen atom. If, for instance, four moles of alpha-amino-anthraquinone are condensed with 1,4,5,8-tetrachloro-anthraquinone, a pentanthrimide is obtained which by ring-closure (carbazolation) gives a khaki-shade dye as described in U. S. Patent No. 2,028,103.

In commercial production in the past, the reaction of the four ingredients above mentioned was invariably carried out in a high-boiling, inert liquid solvent or diluent such as ortho-dichloro-benzene, nitrobenzene, or molten naphthalene. Suggestions are found here and there in the literature to fuse together the ingredients in the absence of a solvent, but as far as we know none of these have even been developed into commercial practice, presumably because of the exceptionally poor yields obtained by these methods due to lack of homogeneous contact between the reactants and non-uniform distribution of heat through the mass.

When solvents or diluents as above illustrated are employed, it is necessary to use from five to ten parts of the liquid per part of total solid reactants, if it is desired to force the reaction to completion. The maximum size of an anthrimide plant charge, is therefore limited to from 400 to 500 pounds reaction product, since it is not practicable to construct larger condensation kettles, considering that the latter have to be equipped with very efficient heating and cooling facilities and with a reflux condenser to avoid losses of the solvent by evaporation. In addition to this limitation in production capacity, the heretofore known methods for producing anthrimides on a commercial scale are highly uneconomical, since the large amount of high boiling solvents used in the condensation must be removed from the reaction product after the reaction is completed. The removal of these solvents involves a costly and hazardous steam distillation or solvent filtration, followed by isolation of the steam distilled product by aqueous filtration, whereby the intermediates are obtained in the form of an aqueous filter cake which has to be dried to be fit for use in the subsequent ring-closure operations. In addition to the unavoidable losses of a considerable amount of these expensive solvents by evaporation and by mechanical losses, the solvent method for making anthrimides involves a serious fire and health hazard since these solvents are inflammable and possess toxic properties.

Also, in the case of the pentanthrimide derived from 1,4,5,8 - tetrachloro - anthraquinone, the former practice generally resulted in a dry powder which resisted "wetting" by the aluminum chloride-sodium chloride melt in which the pentanthrimide was subsequently to be ring-closed, to give a khaki vat dye. To effect "wetting" prolonged contact of the pentanthrimide with the molten aluminum chloride-sodium chloride melt was necessary; this, however, would cause a partial decomposition of the color, resulting in the formation of an inferior product, which showed objectionably redder and duller dyeing shades than the desired standard. To overcome this objection, it has been proposed heretofore to incorporate into the dry pentanthrimide a certain amount of a selected inorganic salt (such as soda ash) by a special premilling operation prior to incorporation of the powder into the ring-closing melt. This obviously involved the added operation of milling.

It is accordingly an object of this invention to provide a new, very economical and safe method for manufacturing anthrimide compounds on a large scale in readily available equipment. A further object is to produce pentanthrimide in a dry form suitable directly for conversion into khaki vat dye, without intermediate filtering, washing and drying operations. A still further object is to obtain as a new and very valuable form of pentanthrimide a dry powder which contains a controlled amount of "baked in" sodium chloride and which disperses readily in the usual aluminum chloride-sodium chloride fusion mass, whereby a vat color of superior dyeing shade is obtained therefrom. A still further object is to provide a new process for making pentanthrimide from tetra-chloro-anthraquinone and alpha-amino-anthraquinone, which makes it possible to combine the formation of the pentanthrimide with its ring-closure in a series of operations which may be carried out to advantage without isolating or removing the pentanthrimide from the apparatus in which it is formed. Still further objects are the saving of expensive solvents and the avoidance of the health hazard connected with the manufacture of anthrimides by heretofore known methods.

These objects and other valuable improvements are accomplished according to our invention by the device of carrying out the anthrimide reaction in an apparatus which is adapted to transmit heat to the reaction mass while subjecting the latter to continuous attrition and mixing. As an example of such apparatus may be mentioned the "rotary baker," which may be defined for the purpose of this invention as a vessel adapted to rotate while the material inside it is being heated, and containing tumbling elements such as rods, balls, slugs or "cyl-pebs," usually of steel, which by their continued tumbling and sliding grind the reaction mass constantly during the reaction period.

We have found that anthrimides can be obtained in technically pure form and also as dry powders consisting of the anthrimides intimately associated with a controlled amount of sodium chloride or sodium bromide, when the dry reactants (amino-anthraquinone, chloro- or bromo-anthraquinones, together with an acid binding agent and a catalyst) are heated in a rotary baker under constnt grinding and mixing conditions until the anthrimide formation is completed. The reaction products which are in the form of dry powders, may be discharged from the rotary baker and used, either with or without removal of the baked-in sodium halide, for various customary purposes such as nitration or ring-closure under standard conditions. Or the powdered reaction mass may be ring-closed directly (after addition of suitable quantities of aluminum chloride and sodium chloride) in the same rotary baker, that is without intermediate handling of the anthrimide, to give the desired final vat dyes, the latter being obtained thereby in a very desirable physical condition, characterized by a uniform and small size of color particle. If an anthrimide free from salts is desired, the latter may readily be extracted with hot water attended by grinding in view of the intimate association ("coalescence") of the sodium chloride and the anthrimide molecules.

The apparatus employed for this invention is itself not novel. A typical rotary baker, and one which is preferred for this invention, may be found described in U. S. Patent No. 2,153,300 (Dahlen and Detrick). Any ball-mill or rod-mill, provided with suitable means for heating and temperature control, and with openings for charging, discharging and communication with the atmosphere, may be employed for our invention. Since a slight excess of soda ash or other acid binding alkalies is used to complete the anthrimide formation, the reaction mass is non-corrosive and can, therefore, be carried out in readily available iron equipment.

The reaction temperature is not critical, so long as it is high enough (above 150° C.) to cause the halogen compound to react with the amino compound to the desired degree. As a rule, temperatures of 200 to 240° C. are required to complete the anthrimide formation within 3 to 5 hours. Higher temperatures are permissible, and we have run some reactions at as high as 350° C. without detrimental effect upon the product.

Without limiting our invention to any particular details, the following examples are given to illustrate our preferred mode of operation. Parts mentioned are by weight.

Example 1

| | Parts |
|---|---|
| 1-benzoylamino-5-chloro-anthraquinone | 180.5 |
| 1-amino-anthraquinone | 117.5 |
| Sodium carbonate | 30 |
| Cuprous chloride | 5 | are charged into a rotary iron baker of the type described in U. S. Patent No. 2,153,300, and intimately mixed at ordinary temperature by rotating 10 to 20 hours. The temperature of the baker is then slowly raised, while rotating the baker, to 200–220° C. and held at this temperature until the evolution of water and carbon dioxide vapours has stopped. From 3 to 8 hours are generally required. The baker is then cooled to room temperature while rotating and the dry powder is discharged to a suitable container.

The resulting product is a red powder consisting of 84 to 86% of 5-benzoyl-amino-1,1'-dianthrimide, the balance being mainly sodium chloride and cuprous chloride. After the inorganic salts are removed by extraction with hot water, under grinding, the anthrimide is obtained in a high state of purity and is identical with the product mentioned in U. S. P. 970,278 (1910) wherein, however, it is obtained in a much less practical manner. As evidence of almost complete reaction between the two organic components, analysis reveals that only .2 to .4% of organically bound chlorine still remain in the product.

Other copper salts, for instance cupric acetate, may be substituted for the cuprous chloride in the above reaction without deleterious effect. Also the molecular equivalent of potassium carbonate may be substituted for the sodium carbonate in this reaction with identical results.

*Example 2*

| | Parts |
|---|---|
| 1-amino-anthraquinone | 111.5 |
| 1-chloro-anthraquinone | 121 |
| Sodium carbonate | 29 |
| Cupric acetate | 5 | are intimately mixed by rotating 10–20 hours at ordinary temperature in a suitable ball mill or rotary baker as described in Example 1. The material is then heated to 200° C., while continuing the rotation and grinding. The temperature is maintained between 200 and 260° C. with continued grinding until the evolution of carbon dioxide and water vapours has ceased. The time required will vary with the temperature, but usually requires from 4 to 6 hours for completion, as determined by analysis for organic chlorine in the reaction product. The reaction is considered complete when the percentage of such chlorine is about .2 to .4%.

The contents of the baker, which are in the form of a fine red powder, may be discharged to a dilution tub for removal of the inorganic salts by extraction, followed by filtration to isolate the pure 1,1'-dianthrimide, or it may be used directly for the preparation of 4,4'-dinitro-1,1'-dianthrimide by nitration in concentrated sulfuric acid.

The amount of sodium carbonate used in the above example is only slightly in excess of that required to react with the liberated hydrochloric acid gas to produce 1 mole of sodium chloride for each mole of 1,1'-dianthrimide formed; however, an excess of sodium carbonate is not harmful, and may be used without changing the quality of the product. Other solid acid binders, such as potassium carbonate or anhydrous sodium acetate, may also be used without adversely affecting the yield or quality of the dianthrimide.

The reaction also proceeds equally well in an iron, nickel, copper or monel-metal rotary baker.

*Example 3*

The procedure and heating conditions are the same as in Example 2, except that 2-chloro-anthraquinone is substituted for the 1-chloro compound therein mentioned. 1,2'-dianthrimide is obtained in good yield.

The same results may be obtained by employing 1-chloro-anthraquinone as in Example 2, but substituting 2-amino-anthraquinone for the 1-amino compound therein mentioned. The charge in this case is preferably heated at 250–260° C. for 6 to 8 hours.

*Example 4*

| | Parts |
|---|---|
| 1,5-diamino-anthraquinone | 60 |
| 1-chloro-anthraquinone | 121 | are well mixed in with

| | Parts |
|---|---|
| Soda ash | 30 |
| Cupric acetate | 5 | and the mixture is heated at 210–240° C. for 6 to 8 hours in a rotary baker as described in Example 1. The 1,5-trianthrimide, intimately associated with sodium chloride and a small amount of copper salts, is recovered as a red powder, which may be used directly in the sodium chloride-aluminum chloride melt to produce the corresponding trianthrimide-carbazole of good quality. By extracting the inorganic salts with hot dilute ammonium hydroxide the trianthrimide itself, in a state of high purity is obtained, in an almost quantitative yield.

Similar results are obtained if the anthraquinone compounds above mentioned are replaced by

| | Parts |
|---|---|
| 1,5-dichloro-anthraquinone | 69.5 |
| 1-amino-anthraquinone | 112 |

*Example 5*

| | Parts |
|---|---|
| 2,6-diamino-anthraquinone | 50 |
| 1-chloro-anthraquinone | 102 |
| Sodium carbonate | 60 |
| Cupric acetate | 5 | are first well mixed by milling in a porcelain ball mill; the composite is then heated to 245–250° C. in an Everdur rotary baker and held at this temperature for 8 hours. The 2,1',6,1''-trianthrimide may be isolated in almost quantitative yield and state of high purity by extraction of the inorganic salts, filtration and drying.

In a similar manner it is possible to react 2 moles of 1-amino-anthraquinone with 1 mole of 2,6-dichloro-anthraquinone using sodium carbonate as an acid absorbing agent and a copper salt as a catalyst.

*Example 6*

| | Parts |
|---|---|
| 1,4,5,8-tetra-chloro-anthraquinone | 34.6 |
| 1-amino-anthraquinone | 89.2 |
| Sodium carbonate | 24.5 |
| Cupric acetate | 5 |
| Copper bronze | 2 | are thoroughly mixed together either in a ball mill or by rotating at room temperature in the iron rotary baker for 16–20 hours. The charge is then heated in the rotating baker to a temperature of 215–260° C. and held at this temperature until a sample washed free from inorganic salt analyzes less than 1.0% chlorine. If the inorganic salts are extracted with hot dilute ammonium hydroxide containing dissolved ammonium chloride, the pentanthrimide remains behind as a dark-colored powder, which is essentially the same as the compound referred to in German Patent No. 262,788 as tetra-alpha-anthraquinonyl-1,4,5,8-tetra-amino-anthraquinone. It may be used directly without extraction of the salts or purification, in the fusion process described in U. S. P. 2,028,103 to give satisfactory color.

Equally good results are obtained if a larger quantity of sodium carbonate is used or if a different solid acid binding agent is employed, such as potassium carbonate.

*Example 7*

The procedure is the same as in Example 6, except that 89.2 parts of 2-amino-anthraquinone are substituted for the 1-amino-compound therein mentioned. The milled mixture is heated in a rotary copper baker at 245–255° C. for 8 hours. The resulting dark product is discharged from the baker and extracted with hot dilute ammonium hydroxide containing some dissolved ammonium chloride to remove the inorganic salts.

On crystallization from 80-85% sulfuric acid, a yellowish-brown compound is obtained which gives a blue-colored solution in concentrated sulfuric acid changing to brown with the addition of trioxymethylene. With anhydrous aluminum chloride in dry nitrobenzene, the compound forms a blue solution. The product obtained from the baker is probably tetra-beta-anthraquinonyl-1,4,5,8-tetra-amino-anthraquinone, not mentioned hitherto in the literature.

Example 8

In a manner similar to the above examples, the following combinations of compounds may be reacted with each other in a rotary baker, in the presence of a solid acid-binding agent and a copper catalyst to produce anthrimides:

(a) 1-benzoyl-amino-4-amino-anthraquinone (1 mole) with 1-benzoyl-amino-5-chloro-anthaquinone (1 mole) or with 1-benzoyl-amino-4-chloro-anthraquinone (1 mole);

(b) 1-benzoyl-amino-5-chloro-anthraquinone (2 moles) with 1,5-, 1,8-, or 1,4-diamino-anthraquinone (1 mole);

(c) 1-benzoyl-amino-4-chloro-anthraquinone (2 moles) with 1,5-, 1,8-, or 1,4-diamino-anthraquinone (1 mole);

(d) 4-bromo-N-methyl-1,9-anthrapyridone (2 moles) with 2,6- or 1,5-diamino-anthraquinone (1 mole);

(e) 8- or 5-amino-2,1(N)-anthraquinone-benzacridone (2 moles) with 1,5- or 1,8-dichloro-anthraquinone (1 mole);

(f) 1-amino-anthraquinone (2 moles) with Bz-1,6-dibromo-benzanthrone (1 mole);

(g) 1-amino- or 2-amino-anthraquinone (1 mole) with Bz-1-bromo-benzanthrone (1 mole);

(h) Dibromo-pyranthrone (1 mole) with 1-amino-anthraquinone (2 moles).

In each of the above cases the reaction gives almost quantitative yields of the corresponding anthrimide compound in technically pure form.

It will be understood that the details of procedure hereinabove set forth are merely illustrative and may be varied within wide limits. Thus, other water-soluble, solid acid-binding agents may be employed in lieu of sodium carbonate, for instance potassium carbonate or sodium acetate. The amount of these alkaline agents is not critical so long as there is a sufficient amount present to react with all of the hydrogen halide released by the condensation. It is advantageous to use the minimum amount in order to reduce the bulk of the charge and also to leave the smallest possible amount of salts in the final product.

Instead of the specified chloro-anthraquinone, the corresponding bromo or iodo derivatives may be employed.

The baking temperature may be varied over a wide range, usually a longer time being required for lower temperatures.

The reactions may be carried out in any type of rotary baker or ball mill so long as there is sufficient mixing and grinding of the ingredients.

While the above description has been restricted specifically to the production of dianthrimides from a halogeno-anthraquinone compound, and an imino-anthraquinone compound, it will be clear that our invention is of a broader nature and may be applied to the synthesis of other imino compounds which involve the reaction of a polynuclear aromatic halogen compound with a polynuclear aromatic primary amine, wherein the initial materials are high-melting solids, and wherein the reaction is generally carried out in the presence of a solid acid-absorbing agent and in the presence of a solid catalyst such as copper or a salt of copper.

The uses and advantages of our invention will now be readily apparent. In the first place, we have eliminated the use of solvents in the manufacture of anthrimides, thereby saving their cost and eliminating their fire- and health-hazards. Secondly, we have simplified the entire process, eliminating many special auxiliary operations required with solvents, such as steam distillation, filtration, recovery of the solvent from the filtrates, etc. Thirdly, we have reduced the bulk of materials to be handled thereby saving both in the space required for operation and in the labor of transporting and handling materials. Fourthly, we have shortened the time of reaction, cutting down the heating period in most cases from the usual 20 hours in the solvent process to some 3 to 5 hours by our process. The fourth and third of the above points together cooperate to increase the productive capacity of a given plant to several times its productivity by the solvent process, which is a factor of great economic importance, particularly in times of national emergency.

Fifthly, by eliminating the solvent, we are enabled to run the reaction at considerably higher temperatures than hitherto possible (even up to 350° C.), which factor in turn enabled us to extend the reaction to materials which have not hitherto been successfully condensed, as illustrated by the case of 2-amino-anthraquinone and 1,4,5,8-tetrachloro-anthraquinone in Example 7 above. Finally, in the case of pentanthrimide and many other anthrimides, the reaction product is obtained in a form which make it exceptionally suitable for direct conversion into dyestuff by ring-closure, by virtue of its fine state of sub-division and by virtue of the intimately associated ("coalesced") sodium chloride content thereof, which enables the material to be "wetted" readily by the subsequent sodium chloride-aluminum chloride melt without undue delay and risk of overheating and decomposition.

We are aware that certain chemical reactions such as sulfur fusions or phthalocyanine formation have been carried out or suggested for carrying out in a ball mill heretofore; but in most such cases the ingredients were liquid or became liquefied during one stage at least of the reaction, or diluents were employed which became liquid at one stage of the reaction, so that homogeneous contact between the reactants was assured by the solution, suspension or diffusion of the reactants in the liquid phase. Also, the number of reactants in such cases was generally limited to two or at most three, and the reactions were of simple, mutual exchange or addition types, that is, not catalytic.

In our process we deal with a catalytic reaction; furthermore, four different materials must be brought together into contact to effect reaction. The materials may or may not undergo local fusion so as to soften the mass and give it temporarily sticky or pasty properties; but at no stage is any one of the components sufficiently molten as to give the mass fluid properties and to provide a liquid phase for homogenizing the remaining ingredients. Nor does it seem that such local fusion or softening is necessary for the reaction, since the reaction has been successfully carried through by us in many cases where the reactants remained solid throughout the operation. Apparently the constant milling and shearing of the particles, attended by continuous mixing is the factor in our process which takes the place of the solvent in bringing the reactants into homogeneous contact. In any event, the results are remarkable, especially when one considers that even in the solvent process not all inert, high-boiling liquids are operative to effect the desired synthesis in the case of pentanthrimide. Thus, although nitrobenzene, trichlorobenzene, and o-dichlorobenzene are chemically related, high-boiling, organic liquids, only the first one has been successful as solvent in the processes of the art above discussed. The other two are dismal failures, and either give no pentanthrimide at all, or are so poor in yield that they cannot be considered from the viewpoint of practical manufacture on a commercial scale.

We claim:

1. In the process of producing an anthrimide by heating an anthraquinone compound having an exchangeable halogen atom with an anthraquinone compound having an $NH_2$ group in the presence of a solid cupriferous catalyst and of an acid absorbing agent selected from the group consisting of the alkali-metal carbonates and acetates, the improvement which consists of heating said materials together at a temperature between 150° and 350° C. while the mixture is being subjected to constant attrition and mixing by the aid of mechanical grinding, whereby to obtain the final reaction mass in solid state but highly comminuted form.

2. The process of producing an anthrimide which comprises heating together at a temperature between 150° and 350° C. a mixture of a halogeno anthraquinone, an amino-anthraquinone, an acid-absorbing agent selected from the group consisting of the alkali-metal carbonates and acetates, and a cupriferous catalyst while subjecting the said mixture to continuous attrition and mixing by the aid of mechanical grinding.

3. The process of producing a pentanthrimide, which comprises heating together at a temperature between 200 and 350° C. a mixture of a tetrachloro-anthraquinone, an amino-anthraquinone, an acid-absorbing agent selected from the group consisting of the alkali-metal carbonates and acetates, and a solid cupriferous catalyst while subjecting the said mixture to continuous attrition and mixing by the aid of mechanical grinding.

4. The process of producing 1,4,5,8-pentanthrimide, which comprises heating together at a temperature of 215 to 260° C. 1 mole of 1,4,5,8-tetrachloro-anthraquinone, with substantially 4 moles of 1-amino-anthraquinone, not less than 2 moles of sodium carbonate, and a catalytic quantity of a catalyst comprising copper metal and a salt of copper, while subjecting the said mixture to continuous attrition and mixing by the aid of mechanical grinding.

JOHN MARLIN TINKER.
OTTO STALLMANN.

REFERENCES CITED

The following references are of record in the file of this patent:

UNITED STATES PATENTS

| Number | Name | Date |
| --- | --- | --- |
| 2,028,103 | Graham | Jan. 14, 1936 |
| 2,152,186 | Graham | Mar. 28, 1939 |
| 2,151,635 | Dettwyler | Mar. 21, 1939 |
| 2,301,286 | Kern et al. | Nov. 10, 1942 |
| 1,401,678 | Darlington | Dec. 27, 1921 |
| 1,530,949 | Kipper | Mar. 24, 1925 |
| 2,153,300 | Dahlen et al. | Apr. 4, 1939 |
| 1,656,575 | Stone et al. | Jan. 17, 1928 |

FOREIGN PATENTS

| Number | Country | Date |
| --- | --- | --- |
| 262,788 | German | July 17, 1913 |
| 9,219 | British | Jan. 27, 1910 |
| 208,162 | German | Mar. 18, 1909 |

OTHER REFERENCES

Fierz-David, "Kunstiche Organische Farbstoffe," 1926, pp. 579 to 583; 1929, pp. 463 to 470.